(12) United States Patent
Kogot et al.

(10) Patent No.: US 10,934,428 B1
(45) Date of Patent: Mar. 2, 2021

(54) MARINE BIODEGRADABLE COMPOSITION FOR 3-D PRINTING

(71) Applicant: United States of America as represented by the Secretary of the Navy, Arlington, VA (US)

(72) Inventors: Joshua M Kogot, Panama City, FL (US); Matthew R Kincer, Panama City, FL (US); April Hirsch, Panama City Beach, FL (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 16/850,302

(22) Filed: Apr. 16, 2020

Related U.S. Application Data

(62) Division of application No. 15/938,027, filed on Mar. 28, 2018, now Pat. No. 10,752,772.

(51) Int. Cl.
| | |
|---|---|
| *B33Y 70/00* | (2020.01) |
| *C08L 67/04* | (2006.01) |
| *C08L 67/02* | (2006.01) |
| *C08L 71/02* | (2006.01) |
| *C08L 1/02* | (2006.01) |
| *C08K 5/00* | (2006.01) |
| *C08L 3/02* | (2006.01) |
| *C08L 5/12* | (2006.01) |
| *C08L 5/06* | (2006.01) |
| *C08L 29/04* | (2006.01) |
| *B29L 31/30* | (2006.01) |

(52) U.S. Cl.
CPC ............ *C08L 67/04* (2013.01); *C08K 5/0033* (2013.01); *C08L 1/02* (2013.01); *C08L 3/02* (2013.01); *C08L 5/06* (2013.01); *C08L 5/12* (2013.01); *C08L 29/04* (2013.01); *C08L 67/02* (2013.01); *C08L 71/02* (2013.01); *B29L 2031/3073* (2013.01); *B33Y 70/00* (2014.12); *C08K 2201/018* (2013.01)

(58) Field of Classification Search
None
See application file for complete search history.

(56) References Cited

U.S. PATENT DOCUMENTS

| | | | | |
|---|---|---|---|---|
| 5,294,249 | A | * | 3/1994 | Luisi .................... A61K 9/4816 |
| | | | | 106/145.1 |
| 8,367,388 | B2 | * | 2/2013 | Bloom ..................... A61K 9/19 |
| | | | | 435/193 |

(Continued)

*Primary Examiner* — Peter A Salamon
(74) *Attorney, Agent, or Firm* — James T. Shepherd

(57) ABSTRACT

A composition is provided for producing a 3-D printable material comprised of a marine biodegradable base polymer and a gelling agent in a ratio preselected to achieve a desired rate of degradation of a structure printed from the material. Suitable polymers include polycaprolactone (PCL), polyhydroxyalkanoate (PHA), or polybutylene succinate (PBS). The gelling agent is typically agar. Faster rates of degradation of the structure are obtained with larger proportions of gelling agent in the composition. The composition may also include biological materials to further promote or control the biodegradation of the structure, and other additives such as nutrients for microorganisms or solidifying agents. 3-D printing of the material occurs at relatively lower temperatures to avoid damage to the biological materials.

11 Claims, 5 Drawing Sheets

(56) References Cited

U.S. PATENT DOCUMENTS

| | | | | |
|---|---|---|---|---|
| 10,752,772 | B1* | 8/2020 | Kogot | B33Y 80/00 |
| 2004/0087998 | A1* | 5/2004 | Lee | A61B 17/12022 |
| | | | | 606/200 |
| 2005/0225752 | A1* | 10/2005 | Takai | G01N 21/4795 |
| | | | | 356/237.1 |
| 2007/0161311 | A1* | 7/2007 | Zikeli | C08K 3/26 |
| | | | | 442/181 |
| 2007/0207186 | A1* | 9/2007 | Scanlon | A61F 2/07 |
| | | | | 424/424 |
| 2010/0023101 | A1* | 1/2010 | Wallace | D01D 5/06 |
| | | | | 514/1.1 |
| 2013/0109781 | A1* | 5/2013 | Lake | C08K 5/09 |
| | | | | 523/124 |
| 2015/0306282 | A1* | 10/2015 | Scanlon | A61L 31/14 |
| | | | | 623/1.11 |
| 2020/0114136 | A1* | 4/2020 | Nangou | A61M 37/00 |

\* cited by examiner

FIG. 3

| Target Life | Agar | PCL | Biologicals |
|---|---|---|---|
| 0 to 3 months | 50-95% | 5-50% | 1% |
| 3 to 6 months | 25-50% | 50-75% | 0.1% |
| More than 6 months | 5-25% | 75-95% | Optional |

US 10,934,428 B1

MARINE BIODEGRADABLE COMPOSITION FOR 3-D PRINTING

CROSS REFERENCE TO RELATED APPLICATION

Pursuant to 35 U.S.C. § 120, this nonprovisional patent application is a divisional application claiming the benefit of priority from co-pending nonprovisional application Ser. No. 15/938,027, having a filing date of Mar. 28, 2018.

STATEMENT OF GOVERNMENT INTEREST

The invention described herein was assigned to the United States Navy and may be used or manufactured by or for the Government of the United States of America for government purposes without payment of royalties. The invention may be available for licensing for commercial purposes; inquiries should be directed to the Naval Surface Warfare Center Panama City Division.

FIELD OF INVENTION

This invention relates to the field of 3-D printing and more specifically to a marine biodegradable 3-D printing process and composition.

BACKGROUND OF THE INVENTION

Unmanned underwater vehicles (UUVs) and other structures or containers are used to house and deliver electronics, sensors, cameras and other equipment in a marine environment. Often, these structures are expendable, i.e., they are designed to be used once or continuously over a finite period of time without expectation that they will be retrieved. For example, a housing that contains acoustic sensors and communications equipment for monitoring an area of the ocean for a specific period of time can be dropped in the ocean and left on the sea floor to collect data during that time and communicate it to the surface. At the end of the period for which monitoring is desired, i.e., at the end of its mission, the housing with its enclosed equipment must be either retrieved from the surface, which may be impractical or expensive, or left behind to degrade in the natural environment over a period of time. However, there is currently no known way to design and produce these structures so that their rate of degradation can be controlled.

Furthermore, these vehicles and structures are typically special-purpose devices, rather than mass produced, and may therefore benefit from the efficient fabrication afforded by the 3-D printing processes known in the art. Currently, modified polylactic acid (PLA), (poly)hydroxybutyrate (PHB), or polyhydroxyalkanoate (PHA) materials are typically used as biodegradable 3-D printing materials. While these materials are biodegradable in a marine environment, the rate of degradation of a structure printed from these materials cannot be selected or control. There is an unmet need to produce marine biodegradable 3-D printable structures for which the rate of degradation of each structure can be selected for a particular mission.

SUMMARY OF THE INVENTION

It is therefore a general purpose and primary object of the present invention to provide a composition and method for the 3-D printing of a marine biodegradable structure for which the rate of degradation of the structure can be controlled. The material can be used for the 3-D printing of a UUV, for example, or a portion thereof such as its housing.

The composition is a 3-D printable material comprised of a biodegradable base polymer and a gelling agent in a ratio preselected to achieve a desired rate of degradation of a structure printed from the material. In one embodiment, the base polymer can be Polycaprolactone (PCL), Polyhydroxyalkanoate (PHA), or polybutylene succinate (PBS), and the gelling agent can be agar. PCL, PHA, and PBS are known biodegradable polymers. Agar is an indigestible polysaccharide that can provide a scaffold support for microorganisms and enzyme materials that can digest, or break down, the polymers. Thus, larger amounts of agar (or other similar gelling agent) in the composition can provide support for larger amounts of microorganisms and enzyme materials which will consequently accelerate the degradation of the structure that is printed from the composition. The composition is extruded to produce 3-D printable filaments. The filaments may then be used in a 3-D printer to form marine biodegradable structures with selected rates of degradation for specific uses.

In another embodiment, biological materials (e.g., microorganisms, enzymes, etc) may be added to the composition to increase the rate of degradation and for a variety of other purposes, such as disabling explosive devices or growing underwater structures. When these biological materials are incorporated into the composition, the extrusion occurs at relatively low temperatures to avoid harming the microorganisms or other biologicals.

In yet another embodiment, additional additives may be included in the composition, such as nutrients to support the growth and activity of microorganisms, antibiotics for microorganism growth selection or growth deterrence, or certain solidifying agents.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein like reference numerals and symbols designate identical or corresponding parts throughout the several views and wherein:

FIG. 3 provides a table of alternative formulations for marine biodegradable compositions for given rates of degradation

DETAILED DESCRIPTION OF THE INVENTION

Figure 1A:
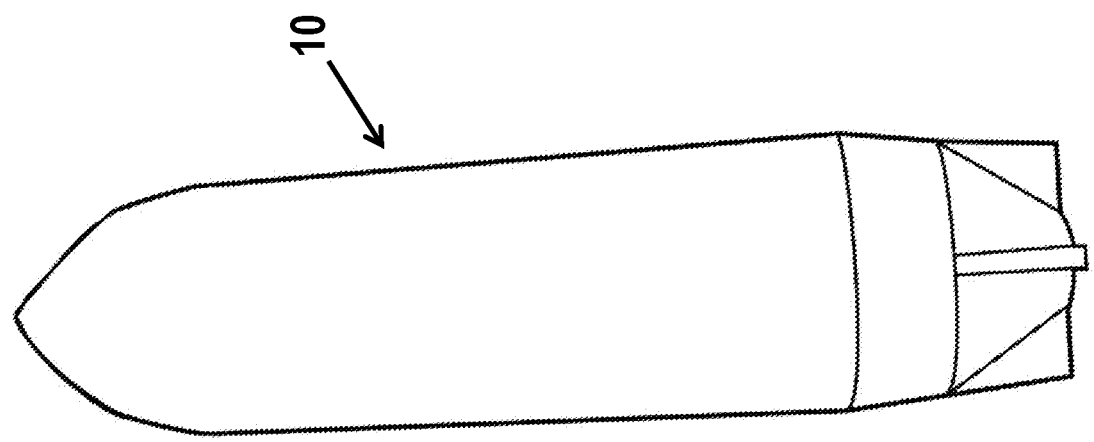
FIGS. 1a, 1b and 1c illustrate an exemplary carrier vehicle constructed by a 3-D printing process using the marine biodegradable material of the present invention.
Figure 1B:
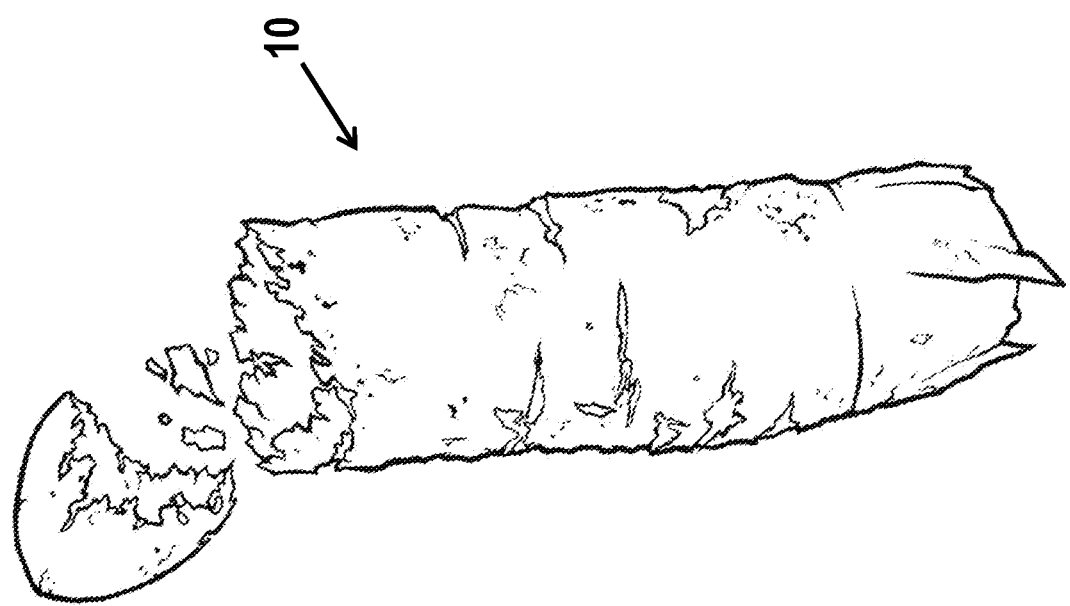
Figure 1C:
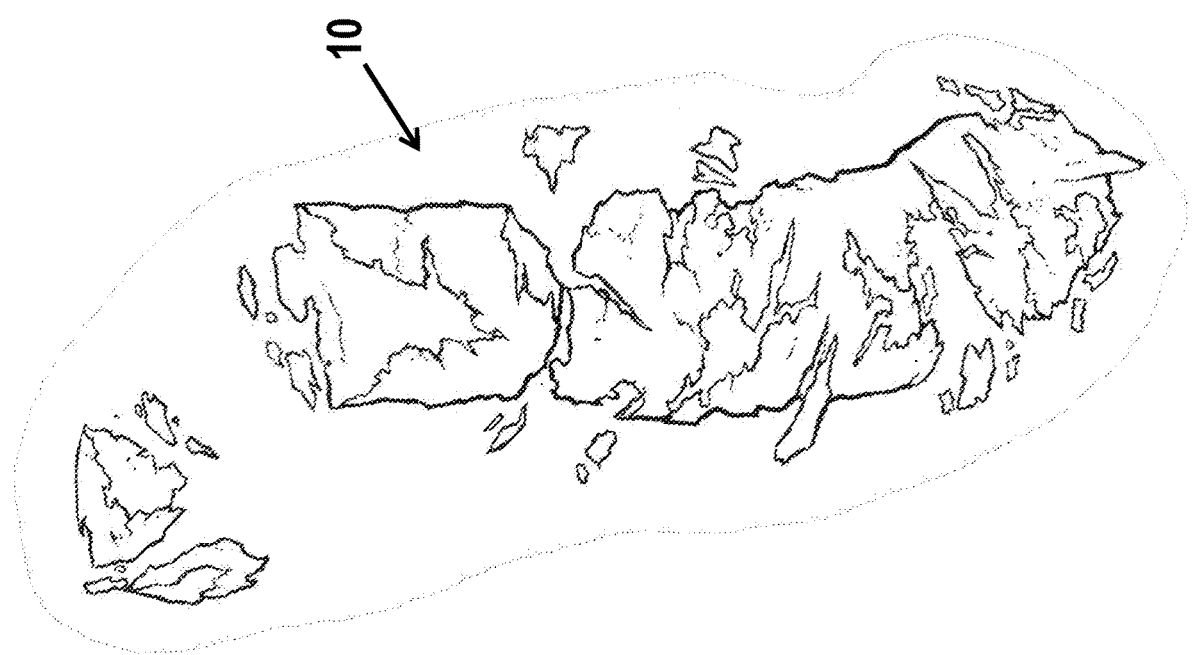

FIGS. 1a, 1b and 1c illustrate an exemplary vehicle (such as a UUV) constructed by a 3-D printing process using the marine biodegradable material of the invention at various stages of the degradation cycle. As discussed above, the vehicle may be used to house and transport a variety of materials and equipment, such as sensors, fuel, motors, batteries, explosives, or chemical compounds (collectively referred to herein as the "payload"). In some embodiments, while it is intact the vehicle insulates and protects the payload from the often harsh ambient underwater environment. When the vehicle degrades, as discussed herein, seawater is able to enter the internal compartments of the vehicle and come into contact with the payload. In some embodiments, the seawater will deactivate payload equipment or materials such as sensors, motors, explosives, etc.

By means of illustration and not limitation, assume that the embodiment shown has a 180-day life cycle. FIG. 1a depicts a vehicle 10 that is intact and ready for deployment, or was recently deployed, in an underwater environment 20. FIG. 1b indicates the degradation of the vehicle 10 at 90 days at which time the vehicle begins to disintegrate. At this stage, the payload in the interior of the vehicle may come into contact with the ambient environment 20 and may be deactivated or otherwise start to corrode or degrade. FIG. 1c indicates the degradation of the vehicle at 180 days at which time the vehicle may be completely disintegrated and its payload is entirely released into the environment 20 where it may be deactivated or subject to further corrosion/degradation.

Figure 2:
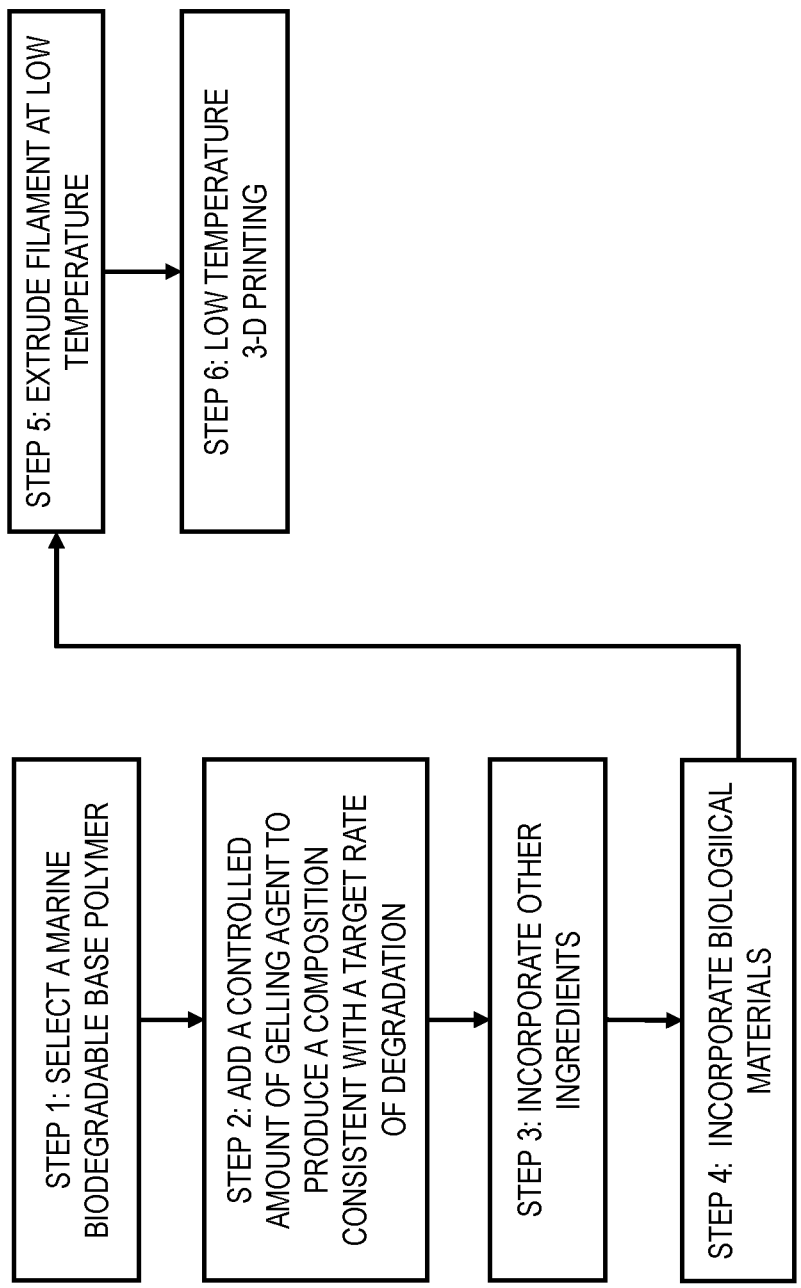
FIG. 2 illustrates an exemplary 3-D printing method for producing a marine biodegradable structure having a selected rate of degradation in the marine environment.

FIG. 2 illustrates an exemplary 3-D printing method for producing a marine biodegradable structure having a selected rate of controlled degradation in the natural environment in accordance with the present invention.

In the exemplary method shown, a biodegradable base material is selected and a selected amount of gelling agent, typically agar, is added to the composition. Agar is a natural material of unbranched polysaccharides of galactose subunits derived from red algae species and is used in the instant invention as a gelling agent. It is not typically biodegradable. The rate of erosion of a device manufactured with this composition depends upon the percentage of agar in the composition. A higher percentage of agar results in faster erosion.

In various embodiments, biological materials may be mixed into the composition and are released as the structure erodes. Examples of biological materials that can be incorporated into the structure include proteins and enzymes which may be used to disable underwater explosive devices or biological organisms which may be used to organically grow underwater structures. Microorganisms and/or enzymes may also be added to speed up the degradation of the structure by feeding on the biodegradable polymer. The low temperature of the mixing, extrusion and 3-D printing processes described herein allows the biological materials to be included. The higher temperatures required to create structures using the previously known 3-D printing processes and compositions would kill the biological materials. This is because the 3-D print head must be heated enough to extrude the previously known compositions during printing. Most biological materials cannot survive in temperatures above 120° C. Agar has a melting point of approximately 85° C., allowing it to be extruded at a temperature safe for the biological materials. Further, it would be preferable to have a base polymer in the composition that has a melting point similar to that of agar. For example, PLA and PHB have melting points of 173° C. and 175° C., respectively. At these temperatures, agar could "burn" or "scorch" during the extrusion process.

Step 1 is the step of selecting a marine biodegradable base polymer. In various exemplary embodiments, the preferred base polymer could be either polycaprolactone (PCL), polyhydroxyalkanoate (PHA), or polybutylene succinate (PBS).

Polycaprolactone (PCL) is a polyester that degrades due to hydrolysis of ester bonds. PCL has a melting temperature of 60° C., which is close to the melting temperature of agar and is safe for biological materials.

Polyhydroxyalkanoate (PHA) is a biodegradable polyester that is produced from the bacterial fermentation of sugars. The use of wide range of different starting monomers gives results to PHA products having a range of different properties including melting points ranging from 40° C. to 180° C.

Polybutylene succinate (PBS) is a biodegradable polyester with similar properties to polypropylene and a melting temperature equal to 115° C.

In various alternative embodiments, the base polymer selected may be natural or synthetic polymers of polyesters, biopolyesters, proteins, polysaccharides, polyanhydrides, polyamines and polyamides.

Step 2 is the step of adding a controlled amount of gelling agent to produce a composition consistent with a target rate of degradation. In the exemplary embodiment illustrated herein the gelling agent is agar, which is the most common gelling agent used in the preparation of microbiology agar plates or petri dishes and serves as an indigestible support for microorganism growth. However, other gelling agents may be used, including agarose, which could be used to create a more neutrally charged polymer and has a melting point of 65.5° C. which is similar to the melting point of PCL (60° C.). In other embodiments, gelatin may be selected as the gelling agent. The gelatin may have a low melting temperature of approximately (35° C.) and is digestible to support microorganism growth.

The advantage of including agar (or other gelling agents) in the composition is that the agar is an indigestible polysaccharide support that can provide scaffold support for microorganisms or enzyme materials that are expected to be present in the ambient environment, the advantages of which are discussed in more detail below. Further, combining agar with the biodegradable polymer selected in Step 1 above enables the impregnation of biological microorganisms or enzymes into the composition prior to or during the 3D printing process.

The ratio of agar to polymer controls the rate of degradation of the carrier vehicle and, when desired, its payload. Various formulations within the scope of the invention may be developed by modifying the base composition to achieve a target life span of the vehicle. For example, FIG. 3 illustrates preferred ratios for different desired rates of degradation for a specific environment when using PCL as the polymer and agar as the gelling agent. In this example, if a target life of 0-3 months is desired, a composition made up of 50%-95% agar, 5%-50% PCL, and up to 1% of biological materials (see discussion of Step 4 below) may be used. If a target life of 3-6 months is desired, a composition made up of 25%-50% agar, 50%-75% PCL, and 0.1%-1.0% biologicals may be used. And, if a target life of more than 6 months is desired, a composition made up of 5%-25% agar and 75%-95% PCL may be used. Similar tables may be readily developed for other compositions that include other polymers and gelling agents. As should be readily apparent to those skilled in the art, the actual ratios used for desired rates of degradation depend on several factors, including the selection of the polymer and gelling agent, the expected environment in which the carrier vehicle would be deployed, as well as the amount of biological materials that are incorporated into the composition as discussed below. Other factors that may drive the selection of the polymer to agar ratio may include design criteria such as specific rigidity, buoyancy, or structural strength requirements.

Returning to FIG. 2, Step 3 is the step of incorporating other ingredients. Additives can be included to tailor the composition to meet specific design requirements of the 3-D printed structure by subtracting mass from either the polymer or the gelling agent and replacing it with the additives. For example, yeast extract may be added in one formulation to provide a nutrient-rich, easily available food source for microorganisms. As an example, the composition could comprise 85% polymer, 5% gelling agent, and 10% yeast extract. Another formulation may comprise 5% polymer, 85% gelling agent, and 10% yeast extract. Hence, other ingredients can be substituted for a quantity of the gelling agent or polymer based on the desired criteria to alter the properties (i.e., produce faster or slower degradation relative to the natural environment). In various embodiments, gel or solidifying agent additives may be added, including pectin, gelatin, starch, cornstarch, cellulose, collagen, natural or synthetic hagfish slime, polyvinyl alcohol, carrageenan or polyethylene glycol. Other ingredients may be added to the composition, including but not limited to yeast extract, casein hydrosylate, glucose, glycerol, nitrate salts, ammonium salts, amino acids and succinate. Other additives for biological growth and sustainment in a biodegradable material may include gelatin, calcium carbonate for rigidity, polyethylene glycols (PEG), plasticizer, common microorganism nutrients necessary for growth and antibiotics for microorganism growth selection or growth deterrence.

Step 4 is the step of incorporating biological materials. The process of biodegradation of the carrier vehicle structure is accomplished by microorganisms or enzymes which consume, or "feed on," the biodegradable polymers that comprise the structure. These biological materials can be present in the ambient seawater environment, where they can latch onto the scaffolding structure provided by the agar or other gelling agent. Additionally, to increase the rate of degradation, selected microorganisms or enzymes may be incorporated into the 3-D printing composition of the present invention. The incorporation of these biological materials can be used to increase the biodegradation rate of the printed polymer-agar blend or serves as an additional scaffold for cementation and sedimentation by microorganisms onto the 3-D printed material. Referring again to FIG. 3, it is shown that a greater percentage of biological materials will result in a faster rate of degradation. Enzymes and intracellular components can be incorporated into the 3-D printed material so that the enzyme thermal stability can be matched to the polymer blend melting temperature.

The low temperature of the mixing, extrusion, and 3-D printing process allowed by the compositions described herein allows the biological materials to be included. The temperature may range from 60° C. to 120° C. The higher temperatures required to create the previously known compositions would kill the biological materials. Examples of biological materials that can be incorporated into the structure include enzymes such as oxidoreductases, lyases, hydrolases, and transferases. Certain enzymes known in the art may be used to disable underwater explosive devices, or used as biological concrete that can organically grow underwater structures when the carrier vehicle degrades.

In various embodiments, the biological materials may include, but are not limited to *Acetonema, Actinomyces, Alkalibacillus, Ammoniphilus, Amphibacillus, Anaerobacter, Anaerospora, Aneurinibacillus, Anoxybacillus, Bacillus, Brevibacillus, Caldanaerobacter, Caloramator, Caminicella, Cerasibacillus, Clostridium, Clostridiisalibacter, Cohnella, Coxiella, Dendrosporobacter, Desulfotomaculum, Desulfosporomusa, Desulfosporosinus, Desulfovirgula, Desulfunispora, Desulfurispora* sp., *Filifactor, Filobacillus, Gelria, Geobacillus, Geosporobacter, Gracilibacillus, Halobacillus, Halonatronum, Heliobacterium, Heliophilum, Laceyella, Lentibacillus* sp., *Lysinibacillus, Mahella, Metabacterium, Moorella, Natroniella, Oceanobacillus, Orenia, Omithinibacillus, Oxalophagus, Oxobacter, Paenibacillus, Paraliobacillus* sp., *Pelospora, Pelotomaculum, Piscibacillus, Planifilum, Pontibacillus, Propionispora* sp., *Salinibacillus, Salsuginibacillus, Seinonella, Shimazuella, Sporacetigenium, Sporoanaerobacter, Sporobacter, Sporobacterium, Sporohalobacter, Sporolactobacillus* sp., *Sporomusa, Sporosarcina, Sporotalea, Sporotomaculum, Syntrophomonas, Syntrophospora, Tenuibacillus, Tepidibacter, Terribacillus, Thalassobacillus, Thermoacetogenium, Thermoactinomyces, Thermoalkalibacillus, Thermoanaerobacter, Thermoanaeromonas, Thermobacillus, Thermoflavimicrobium, Thermovenabulum* sp., *Tuberibacillus, Virgibacillus* and *Vulcanobacillus* sp.

Referring back to FIG. 2, Step 5 is the step of extruding filament material from the composition of the present invention at a low temperature. In one embodiment, the polymer and agar mixtures are blended using an extruder (i.e., single or double screw) at the requisite melting temperature for 10 minutes. The resulting blended materials are extruded at diameters of 1.7 mm-3.0 mm creating 3-D printable filaments. However, the diameter may vary depending on the 3-D printing approach or printer type employed.

The temperature at which the extrusion occurs depends on the specific materials used. For example, when using a composition made up of PCL and agar, the extrusion temperature will be approximately 75° C. In either case where biological materials will be incorporated (Step 4), the extrusion temperature will typically be below 120° C. As discussed above, typical known 3-D printing materials such as PLA have a melting point too high for blending with the agar material or any incorporated biological materials. However, using PCL, PHA, and PBS in the base composition allows blending of those materials with agar and biologicals because they have a lower melting point that will not result in scorching or burning the agar or destroying the biologicals during the printing process.

Step 6 is the step of low-temperature 3-D printing using the filaments extruded from the novel compositions described herein (i.e, in Step 5) and using techniques and equipment known in the art.

Although the invention has been described relative to specific embodiments thereof, there are numerous variations and modifications that will be readily apparent to those skilled in the art in light of the above teachings. It is therefore to be understood that, within the scope of the appended claims, the invention may be practiced other than as specifically described.

ratures to avoid damage to the biological materials.

What is claimed as new and desired to be secured by Letters Patent of the united States is:

1. A material for use in the 3-D printing of a marine biodegradable structure, said material comprising:
   a marine biodegradable polymer; and
   a gelling agent.

2. The material of claim 1, wherein the ratio of said polymer to said gelling agent is selected to achieve a target rate of degradation of the structure.

3. The material of claim 2, wherein said polymer material is selected from the group consisting of polycaprolactone (PCL), polyhydroxyalkanoate (PHA), or polybutylene succinate (PBS).

4. The material of claim 3, wherein said gelling agent is agar.

5. The material of claim 3, wherein said gelling agent is selected from the group consisting of agar, agarose, and gelatin.

6. The material of claim 2, further comprising biological materials.

7. The material of claim 6, wherein said biological materials are capable of consuming said polymer.

8. The material of claim 7, wherein said biological materials are enzymes.

9. The material of claim 6, wherein said biological materials are selected to provide cementation and sedimentation of microorganisms that are present in a selected ambient environment.

10. The material of claim 2, further comprising solidifying agent additives selected from the group consisting of pectin, starch, cornstarch, cellulose, collagen, synthetic hagfish slime, polyvinyl alcohol, carrageenan, and polyethylene glycol.

11. The material of claim 2, further comprising nutrients capable of promoting microorganism growth.

* * * * *